(12) United States Patent
Wong et al.

(10) Patent No.: US 9,679,498 B2
(45) Date of Patent: Jun. 13, 2017

(54) METHOD AND APPARATUS FOR PROVIDING A PRESENTATION MODEL FOR AN EXERCISE

(71) Applicant: Change Healthcare LLC, Alpharetta, GA (US)

(72) Inventors: Eldon Allan Wong, Vancouver (CA); Laurie Bergeron, Langley (CA)

(73) Assignee: Change Healthcare LLC, Alpharetta, GA (US)

(*) Notice: Subject to any disclaimer, the term of this patent is extended or adjusted under 35 U.S.C. 154(b) by 144 days.

(21) Appl. No.: 14/231,382

(22) Filed: Mar. 31, 2014

(65) Prior Publication Data

US 2015/0279236 A1    Oct. 1, 2015

(51) Int. Cl.
*G09B 7/00*    (2006.01)
*G09B 23/28*    (2006.01)
*G09B 5/02*    (2006.01)

(52) U.S. Cl.
CPC .............. *G09B 23/28* (2013.01); *G09B 5/02* (2013.01)

(58) Field of Classification Search
USPC ........................................................ 434/262
See application file for complete search history.

(56) References Cited

U.S. PATENT DOCUMENTS 6,106,297 A * 8/2000 Pollak ..................... G09B 5/00
434/11

* cited by examiner

*Primary Examiner* — Kesha Frisby
(74) *Attorney, Agent, or Firm* — Alston & Bird LLP

(57) ABSTRACT

A method, apparatus and computer program product are provided in order to provide a presentation model. An example method may include receiving a selection of an exercise backdrop, displaying a representation of the exercise backdrop, receiving user input performed against an interface displaying the representation of the exercise backdrop, mapping the user input to an action, and generating an exercise comprising the exercise backdrop and a plurality of actions comprising the action.

20 Claims, 8 Drawing Sheets

METHOD AND APPARATUS FOR PROVIDING A PRESENTATION MODEL FOR AN EXERCISE

TECHNOLOGICAL FIELD

Example embodiments of the present invention relate generally to presentations and, more particularly, to a model for providing recording and playback features for a presentation.

BACKGROUND

Educators have long known that visual aids are an important component to teaching students about various concepts. As computer use has become more common, various applications have been developed that assist educators with creating these visual aids. Video authoring tools, screen recording applications, animation tools, and presentation applications allow users to create visual aids that can be played back during the teaching process to assist students with absorbing the information. However, these tools often require recording the entire set of input at once (e.g., as a video) and playback results in a single output of the combined set of input. Making a change to a part of the visual aid requires either complicated video editing techniques or re-recording of the entire presentation. These tools also record an entire continuum of actions. For example, if a recording has a duration of 10 seconds with inputs at 1 second and 5 seconds, all 10 seconds of input are recorded to capture the inputs at 1 second and 5 seconds. This results in inefficient storage and playback of the visual aid, as all 10 seconds must be recorded despite the fact that the only relevant inputs occur at 1 second and 5 seconds. Through applied effort, ingenuity, and innovation, Applicant has solved many of these identified problems by developing a solution that is embodied by the present invention, which is described in detail below

BRIEF SUMMARY

A method, apparatus and computer program product are therefore provided according to an example embodiment of the present invention in order to provide a presentation model for an exercise. Embodiments may include a method. The method includes receiving a selection of an exercise backdrop, displaying a representation of the exercise backdrop, receiving user input performed against an interface displaying the representation of the exercise backdrop, mapping the user input to an action, and generating, using a processor, an exercise comprising the exercise backdrop and a plurality of actions comprising the action. The representation of the exercise backdrop may be a placeholder image other than the exercise backdrop. The at least one action may be a freehand drawing action, a shape display action, or an icon display action. The user input may include a plurality of individual input operation, and the action may be a single action. The action may include an action type and at least one action attribute. In some embodiments, the method further includes playing back the exercise by at least displaying the exercise backdrop in a playback interface, and applying the plurality of actions to the exercise backdrop in a sequence corresponding to an order in which the plurality of actions were input during the recording process. The exercise may include dynamic logic for selecting the exercise backdrop, and displaying the exercise backdrop in the playback interface may further include executing the dynamic logic to select the exercise backdrop. The method may also include receiving a selection of a backdrop toggle control during playback, and hiding the exercise backdrop in response to receiving the selection of the backdrop toggle. The method may also include providing an interface for annotating the exercise backdrop during playback. In some embodiments, the exercise backdrop is an image corresponding to a medical imaging study for a particular patient, and wherein the action illustrates at least one step of a medical procedure under consideration for the particular patient.

Embodiments may also provide an apparatus an apparatus. The apparatus includes processing circuitry. The processing circuitry is configured to cause the apparatus to receive a selection of an exercise backdrop, to display a representation of the exercise backdrop, to receive user input performed against an interface displaying the representation of the exercise backdrop, to map the user input to an action, and to generate an exercise comprising the exercise backdrop and a plurality of actions comprising the action. The representation of the exercise backdrop may be a placeholder image other than the exercise backdrop. In some embodiments, the at least one action is a freehand drawing action, a shape display action, or an icon display action. The user input may include a plurality of individual input operation, and the action may be a single action. The action may include an action type and at least one action attribute. In some embodiments, the apparatus may be further caused to display the exercise backdrop in a playback interface, and to apply the plurality of actions to the exercise backdrop in a sequence corresponding to an order in which the plurality of actions were input during the recording process. The exercise may include dynamic logic for selecting the exercise backdrop, and displaying the exercise backdrop in the playback interface may include executing the dynamic logic to select the exercise backdrop. The apparatus may be further caused to receive a selection of a backdrop toggle control during playback, and to hide the exercise backdrop in response to receiving the selection of the backdrop toggle. In some embodiments, the apparatus is further caused to provide an interface for annotating the exercise backdrop during playback.

Embodiments may also provide a computer program product. The computer program product may include at least one computer-readable storage medium bearing computer program instructions embodied therein for use with a computer. The computer program instructions may include program instructions configured to receive a selection of an exercise backdrop, to display a representation of the exercise backdrop, to receive user input performed against an interface displaying the representation of the exercise backdrop, to map the user input to an action, and to generate an exercise comprising the exercise backdrop and a plurality of actions comprising the action.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
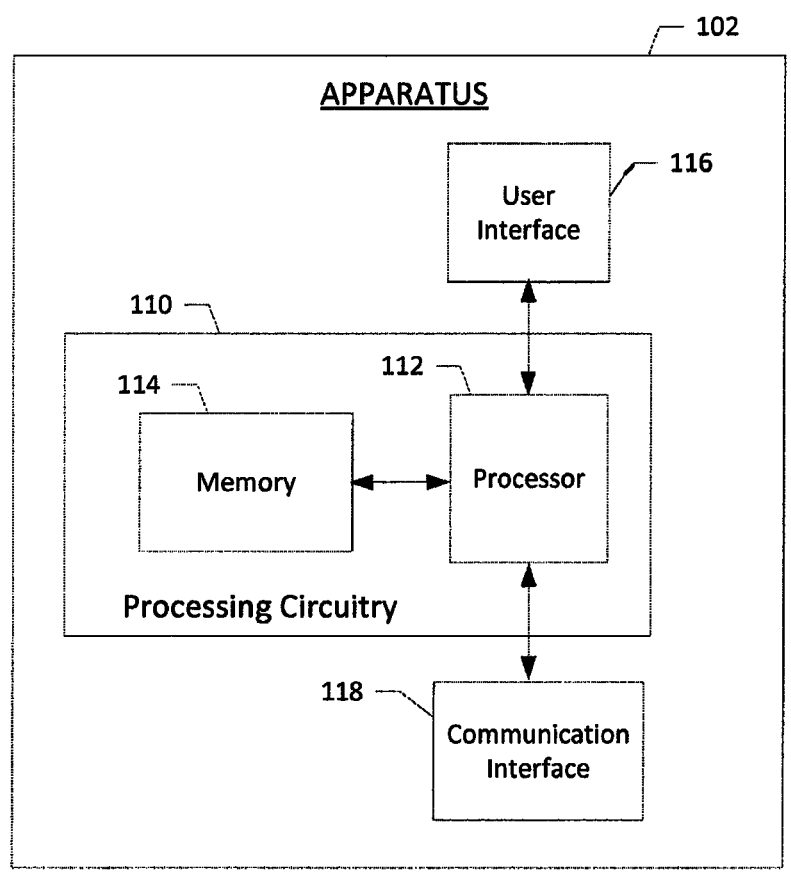
Figure 2:
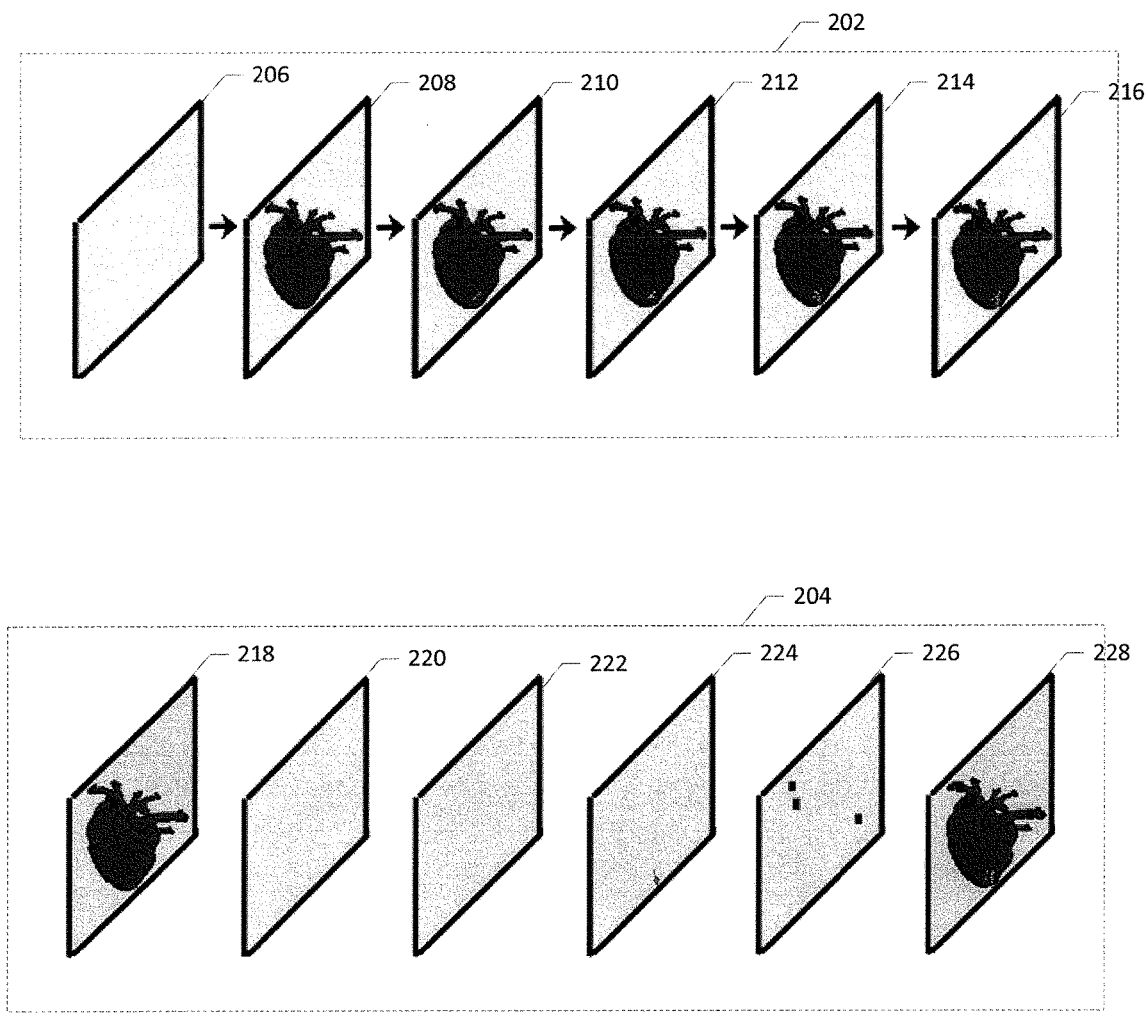
Figure 3:
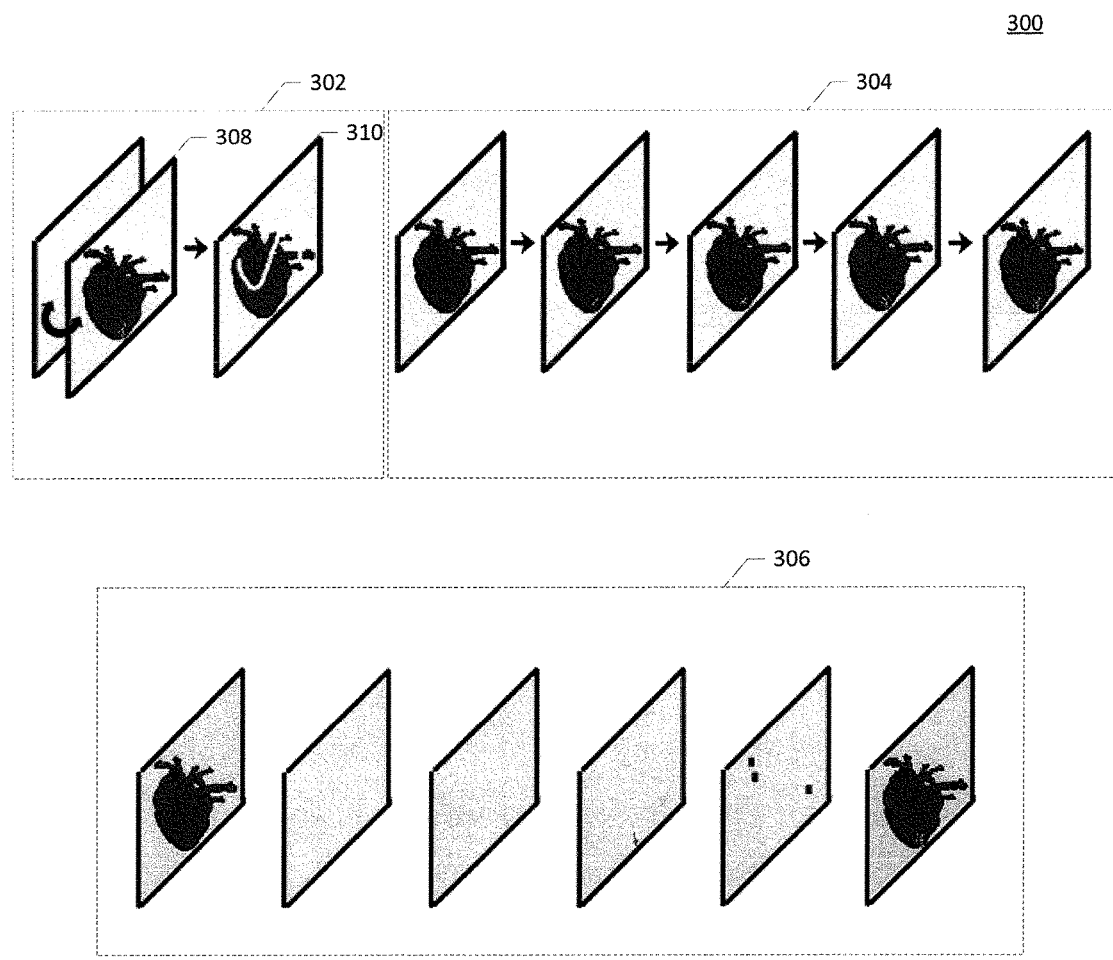
Figure 4:
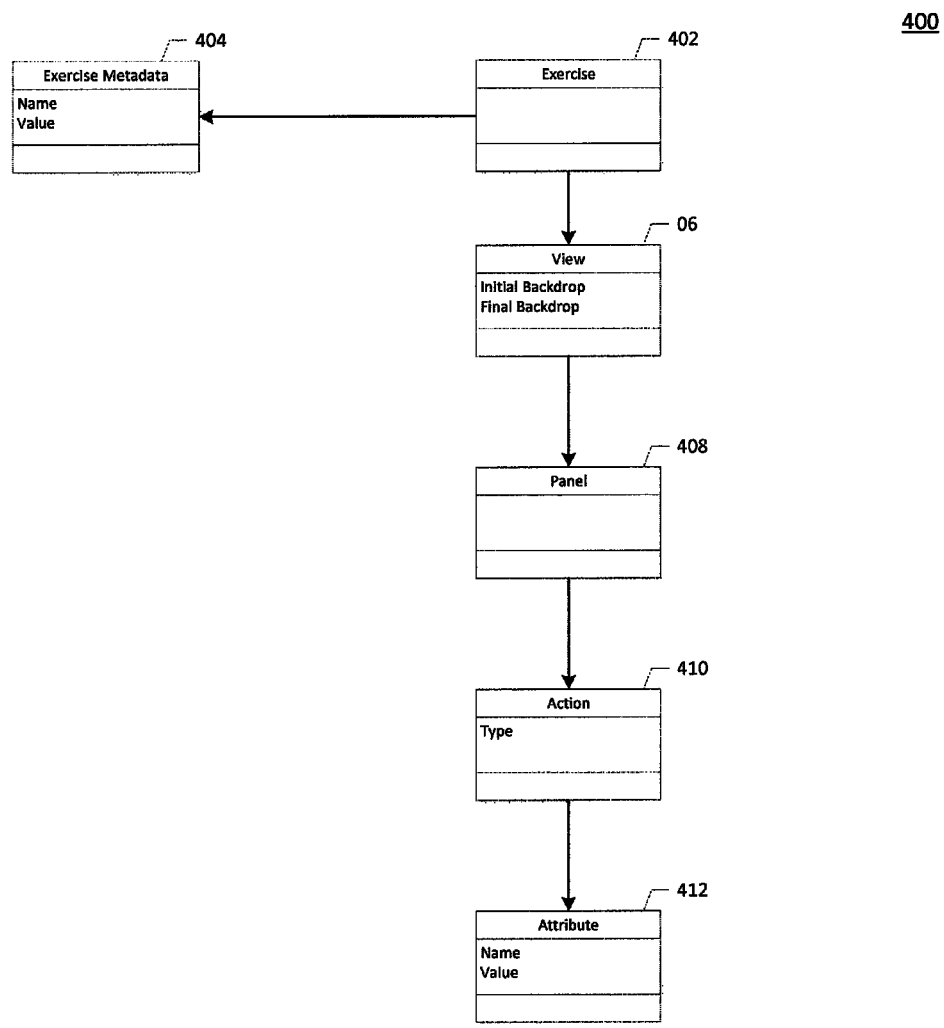
Figure 5:
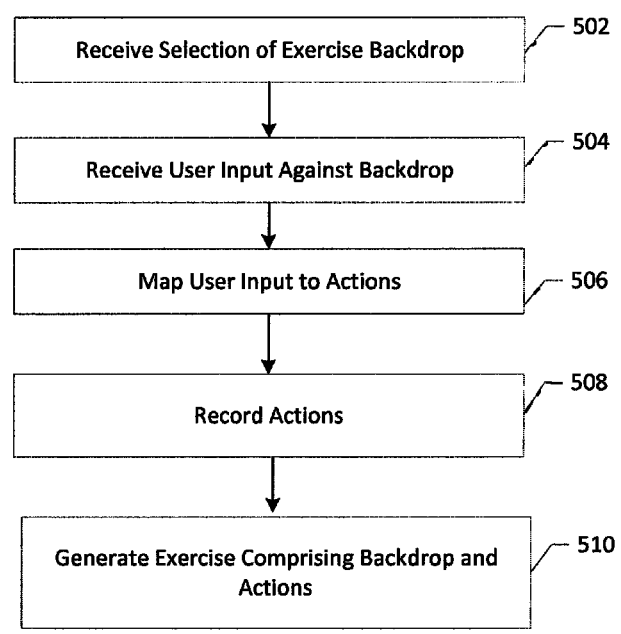
Figure 6:
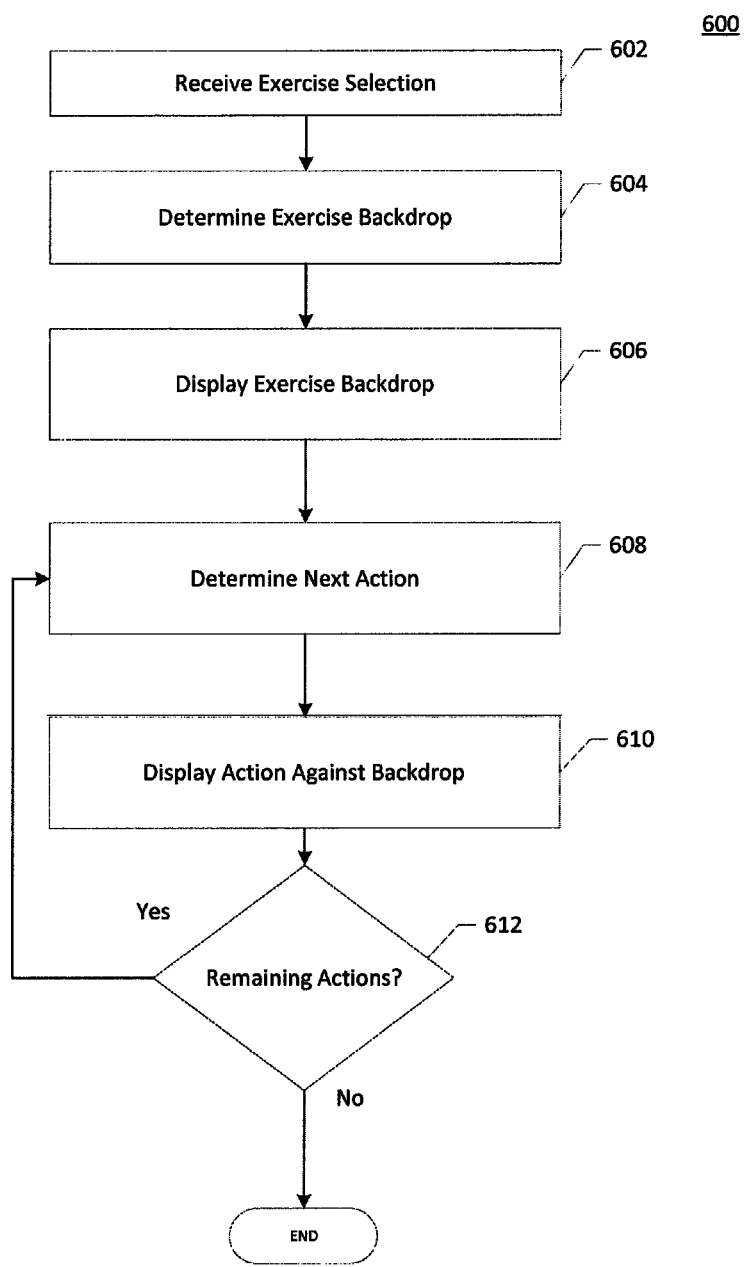
Figure 7:
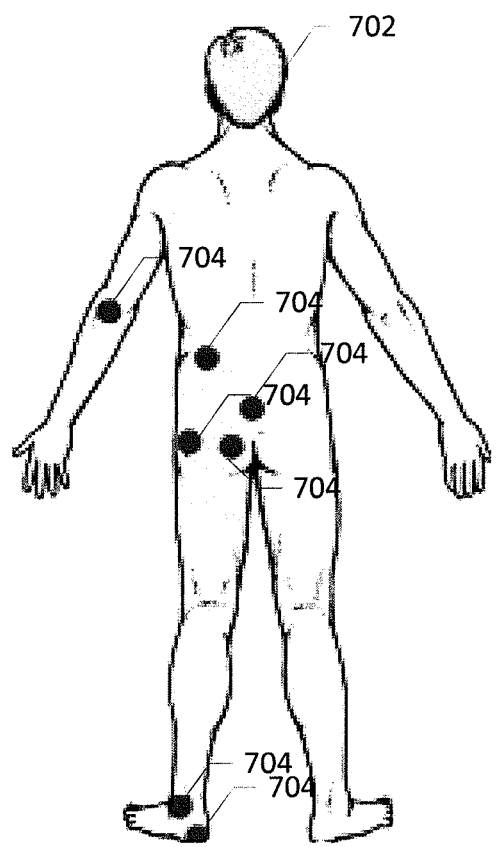

Having thus described certain embodiments of the invention in general terms, reference will now be made to the accompanying drawings, which are not necessarily drawn to scale, and wherein:

FIG. 1 is a block diagram of an apparatus that may be specifically configured in accordance with example embodiments of the present invention;

FIG. 2 is an illustration of an example recording process for generating an exercise in accordance with example embodiments of the present invention;

FIG. 3 is an illustration of an example playback process for playing back an exercise in accordance with example embodiments of the present invention;

FIG. 4 is a block diagram of an example data model for storing an exercise in accordance with example embodiments of the present invention;

FIG. 5 is a flow diagram of an example method for recording an exercise in accordance with embodiments of the present invention;

FIG. 6 is a flow diagram of an example method for playing back an exercise in accordance with embodiments of the present invention;

FIG. 7 is an illustration of an example use of an exercise to track patient care in accordance with embodiments of the present invention; and FIGS. 8A-8D illustrate an example use of an exercise to provide procedure information in accordance with embodiments of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Introduction and Definitions

A method, apparatus and computer program product are provided in accordance with example embodiments of the present invention in order to provide a presentation model. In this regard, a method, apparatus and computer program product of an example embodiment may determine a backdrop for an exercise. User input against the backdrop may be recorded as a series of actions, and stored in a model comprising identifiers for the backdrop and the particular actions. During playback, the recorded actions may be performed against a determined backdrop as read from the model. In this manner, embodiments advantageously provide for lightweight, efficient, and interactive playback of a presentation.

For the purposes of this application, the term "exercise" is intended to refer to a set of user inputs recorded against a backdrop image. Although in some embodiments, the backdrop image may be fixed, it should be appreciated that a given exercise may have a dynamically determined backdrop at the time of playback. An exercise is defined by an exercise data model, an example of which is described below with respect to FIG. 4. Although example embodiments described herein primarily relate to the recording and playback of exercises, it should be appreciated that exercises may also be processed in alternative manners. For example, one or more exercises may be analyzed and compared against other exercises, data mined for analytic information, provided as input to other applications for storage, or the like.

Example Apparatus

FIG. 1 illustrates a block diagram of an apparatus 102 in accordance with some example embodiments. The apparatus 102 may be any computing device capable of providing for recording and/or playback of an exercise as described herein. For example, the apparatus 102 may be implemented as a server (e.g., an application server implemented as a standalone or rack-mounted server), a smart phone, a personal digital assistant, a tablet computer, a netbook computer, a laptop, a picture archiving and communication system (PACS) workstation, or a desktop computer. The apparatus 102 may be operable to receive user inputs performed against a backdrop and record the user inputs as an exercise. Additionally or alternatively, the apparatus 102 may be operable to play back an exercise via a user interface. Accordingly, it will be appreciated that the apparatus 102 may comprise an apparatus configured to implement and/or otherwise support implementation of various example embodiments described herein.

It should be noted that the components, devices or elements illustrated in and described with respect to FIG. 1 below may not be mandatory and thus some may be omitted in certain embodiments. Additionally, some embodiments may include further or different components, devices or elements beyond those illustrated in and described with respect to FIG. 1.

The apparatus 102 may include or otherwise be in communication with processing circuitry 110 that is configurable to perform actions in accordance with one or more example embodiments disclosed herein. In this regard, the processing circuitry 110 may be configured to perform and/or control performance of one or more functionalities of the apparatus 102 (e.g., functionalities of a computing device on which the apparatus 102 may be implemented) in accordance with various example embodiments, and thus may provide means for performing functionalities of the apparatus 102 (e.g., functionalities of a computing device on which the apparatus 102 may be implemented) in accordance with various example embodiments. The processing circuitry 110 may be configured to perform data processing, application execution and/or other processing and management services according to one or more example embodiments. In some embodiments, the apparatus 102 or a portion(s) or component(s) thereof, such as the processing circuitry 110, may be embodied as or comprise a chip or chip set. In other words, the apparatus 102 or the processing circuitry 110 may comprise one or more physical packages (e.g., chips) including materials, components and/or wires on a structural assembly (e.g., a baseboard). The apparatus 102 or the processing circuitry 110 may therefore, in some cases, be configured to implement an embodiment of the invention on a single chip or as a single "system on a chip." As such, in some cases, a chip or chipset may constitute means for performing one or more operations for providing the functionalities described herein.

In some example embodiments, the processing circuitry 110 may include a processor 112 and, in some embodiments, such as that illustrated in FIG. 1, may further include memory 114. The processing circuitry 110 may be in communication with or otherwise control a user interface 116 and/or a communication interface 118. As such, the processing circuitry 110 may be embodied as a circuit chip (e.g., an integrated circuit chip) configured (e.g., with hardware, software or a combination of hardware and software) to perform operations described herein.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 112 may comprise a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In some example embodiments, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform one or more operations described herein.

In some example embodiments, the memory 114 may include one or more non-transitory memory devices such as, for example, volatile and/or non-volatile memory that may be either fixed or removable. In this regard, the memory 114 may comprise a non-transitory computer-readable storage medium. It will be appreciated that while the memory 114 is illustrated as a single memory, the memory 114 may comprise a plurality of memories. The plurality of memories may be embodied on a single computing device or may be distributed across a plurality of computing devices collectively configured to function as the apparatus 102. The memory 114 may be configured to store information, data, applications, instructions and/or the like for enabling the apparatus 102 to carry out various functions in accordance with one or more example embodiments. For example, the memory 114 may be configured to buffer input data for processing by the processor 112. Additionally or alternatively, the memory 114 may be configured to store instructions for execution by the processor 112. As yet another alternative, the memory 114 may include one or more databases that may store a variety of files, contents or data sets. Among the contents of the memory 114, applications may be stored for execution by the processor 112 in order to carry out the functionality associated with each respective application. In some cases, the memory 114 may be in communication with one or more of the processor 112, user interface 116, or communication interface 118 via a bus or buses for passing information among components of the apparatus 102.

The user interface 116 may be in communication with the processing circuitry 110 to receive an indication of a user input at the user interface 116 and/or to provide an audible, visual, mechanical or other output to the user. The user interface 116 may be employed to facilitate recording and/or playback of an exercise. The user interface 116 may include, for example, a keyboard, a mouse, a joystick, a display, a touch screen display, a microphone, a speaker, a Light Emitting Diode (LED), a lighting device, and/or other input/output mechanisms.

The communication interface 118 may include one or more interface mechanisms for enabling communication with other devices and/or networks. In some cases, the communication interface 118 may be any means such as a device or circuitry embodied in either hardware, or a combination of hardware and software that is configured to receive and/or transmit data from/to a network and/or any other device or module in communication with the processing circuitry 110. By way of example, the communication interface 118 may be configured to enable the apparatus 102 to communicate with another computing device via a wireless network, such as a wireless local area network (WLAN), cellular network, and/or the like. Additionally or alternatively, the communication interface 118 may be configured to enable the apparatus 102 to communicate with another computing device via a wireline network. In some example embodiments, the communication interface 118 may be configured to enable communication between the apparatus 102 and one or more further computing devices via the internet. Accordingly, the communication interface 118 may, for example, include an antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet or other methods.

Having now described an apparatus configured to implement and/or support implementation of various example embodiments, features of several example embodiments will now be described. It will be appreciated that the following features are non-limiting examples of features provided by some example embodiments. Further, it will be appreciated that embodiments are contemplated within the scope of disclosure that implement various subsets or combinations of the features further described herein. Accordingly, it will be appreciated that some example embodiments may omit one or more of the following features and/or implement variations of one or more of the following features.

Example Recording Operation

FIG. 2 depicts an illustration of a recording operation for recording an exercise in accordance with example embodiments of the present invention. The recording operation includes a series of recorded input operations 202 which are mapped to a recorded exercise 204. In the instant example, an exercise is being recorded for performing a heart procedure (e.g., pericentesis placement or a valve replacement). The instant procedure includes several steps to be performed by a medical practitioner, including locating an insertion site inferior to the heart's umbilicus, determining a level of percussed dullness, insertion of a heart catheter, and identifying possible sites of dissection, lesions, and/or possible congenital defects. Each of these actions is illustrated in the set of recorded input operations 202.

The first input operation 206 begins with a blank input screen. Prior to beginning recording operations, a set of playback options may be specified. These playback options may affect playback of the exercise at a later time. These playback options may be locked at the time of recording in some embodiments, while in other embodiments, the playback options may be changed during playback. Example playback options are described further below with respect to FIG. 3. The second input operation 208 illustrates selection of a particular backdrop image. In this case, the backdrop image is of a human heart. It should be appreciated that the backdrop image may be chosen by a variety of methods, either manually or dynamically. For example, a user may select a particular patient's medical records and be presented with a choice of medical imaging studies associated with the selected patient for use as a backdrop. Alternatively, the backdrop may be chosen from a particular teaching file associated with or selected by the user. The image may be stored according to any known format for image storage, including but not limited to BMP, GIF, PNG, JPEG, PDF, or the like.

At the third input operation 210, the insertion site inferior to the heart's umbilicus is located, as indicated by the user drawing a line on the backdrop image. The line may be drawn according to any known input method, including but not limited to touch screen input, mouse cursor input, keyboard input, gesture input, or the like. It should be appreciated that each action performed against the backdrop may be associated with a particular user input, such that when each user input ends, a new action is created. For example, if the line indicating the insertion site is drawn using a mouse cursor, the particular action may begin when the user clicks the mouse button, and end when the user releases the mouse button after marking the insertion site. It should be appreciated that a distinction is contemplated between actions that are stored during the recording process and literal user inputs. The stored actions represent actions that are derived from the user input. For example, the mouse click, drag, and release operation described above would include at least three literal user inputs, one for the click, one for the drag, and one for the release, in order to mark the location of the insertion site. In contrast, the action derived from the user input would be a single action, noting that particular screen coordinates were marked. As such, it should be appreciated how stored actions are not literal recorded user inputs, but rather provide a more lightweight way for storing exercise data.

At the fourth input operation 212, a level of percussed dullness is determined and marked. As with the third input operation 210, user input is provided to mark the level of percussed dullness, which may be stored as a separate action. At the fifth input operation 214, a user input is provided to indicate insertion of the catheter at the insertion site identified in the previous actions. The fifth input operation 214 may include selection of a catheter tool or icon which simulates the placement of a catheter on the heart in the exercise. In this manner, it should be appreciated that the actions mapped to the user input provided in the recording operation may also include the use of icons, predefined shapes or patterns, images, or other tools. For example, the user input may be mapped to an action dictating placement of an icon at a particular screen location. A sixth input operation 216 may be performed to label areas of the heart to check for possible sites of dissection, lesions, and/or possible congenital defects, indicated as rectangular boxes placed on the heart backdrop at the position of these possible sites.

By monitoring the user input operations 206-216, a recorded exercise 204 may be generated. The recorded exercise 204 may be stored as part of an exercise data model, such as described below with respect to FIG. 4. The recorded exercise 204 may result from a mapping process from the user input provided during the series of recorded input operations 202, such that individual or sets of input operations are mapped to particular actions during the recording process. The recorded exercise 204, in this example embodiment, includes a backdrop 218, a set of recorded actions 220-226, and a final result 228.

The backdrop 218 represents selection of the heart backdrop, as performed during the second input operation 208. The first recorded action 220 represents marking of the location of the insertion site inferior to the inferior to the heart's umbilicus as performed during the third input operation 210. The second recorded action 222 represents marking of a level of percussed dullness during the fourth input operation 212. The third recorded action 224 represents insertion of the catheter as performed during the fifth input operation 214. The fourth recorded action 226 represents marking of the locations of possible sites of dissection, lesions, and/or possible congenital defects, with rectangular boxes as performed during the sixth input operation 216. The final result 228 illustrates each of the actions 220-226 as they appear applied to the backdrop 218.

Example Playback Operation

FIG. 3 depicts an illustration of a playback and interaction operations for interacting with an exercise in accordance with example embodiments of the present invention. As described above, once an exercise has been recorded, it may be played back or otherwise interacted with. FIG. 3 depicts example interactions 302 and an example playback operation 304 based on an example exercise 306. For the purposes of this example, the recorded exercise corresponds to the exercise recorded above with respect to FIG. 3. The example interactions 302 may include a backdrop toggle 308 and viewer annotations 310. The backdrop toggle 308 represents an interaction whereby a user may cause the backdrop of the exercise to disappear to better view the annotations. It should also be appreciated that similar operations could be performed to remove annotations while allowing the backdrop to remain. The viewer annotations 310 may allow the user to add markup to the backdrop or exercise in order to practice the actions of the exercise, make notes for later, or perform various other tasks. The example interactions 302 may be performed according to various input techniques, such as the use of interface controls provided in a playback application, selection of particular "hotkeys" for particular interactions, or the like.

The playback operation 304 illustrates how a series of actions of an example exercise 306 may be played back to allow for viewing of the exercise. In the present example, the playback operation 304 illustrates how particular actions from the example exercise (e.g., the actions described above with respect to elements 218-228 of FIG. 2) can be performed against a backdrop to display the actions to a viewer of the exercise as it is played back in the playback operation 304. Playback of the exercise 304 may include opening of the exercise in an application designed to view exercises. Such an application may be a standalone application (e.g., a specially designed playback application) or integrated into another application, such as a web browser or a Picture Archiving and Communications System (PACS) workstation application. Playback of the application may be performed by providing individual frames of playback associated with particular actions. For example, each action may be applied to the backdrop one at a time, and every time the user clicks a mouse or otherwise provides input, the next action may be performed against the backdrop. It should also be appreciated that various alternative measures may also be employed for facilitating playback. For example, given actions may be associated with particular timers which, upon expiration, trigger the next action. Playback may also be associated with other user interface mechanisms, such as audio or tactile/haptic playback. For example, a given action may include an audio recording that plays in response to applying the action against the backdrop, or the action may include a vibration or other tactile/haptic feedback when the action is triggered.

Playback of the exercise may also be performed according to various playback options. For example, when performing a playback operation, a user may select a particular draw method (e.g., whether to draw a single point at a time, whether to draw an entire panel of actions at once, or whether to draw the entire exercise set of actions at once), a draw interval (e.g., a delay between drawing actions), whether to hide previous panels when drawing new panels, or the like.

Example Data Model

FIG. 4 illustrates an example data model 400 for storing exercise information in accordance with some example embodiments of the present invention. The data model 400 is illustrated as a series of parent-child relationships among objects stored within the data model. It should be appreciated that, while the example data model 400 is illustrated with one-to-one relationships among objects for the sake of clarity and brevity, embodiments may employ many-to-one relationships as well, allowing for a plurality of views, panels, actions, attributes, and the like.

The example data model 400 includes an exercise object 402. The exercise object 402 may provide the top level definition, identifier, and playback options for the particular exercise being recorded, played, or otherwise interacted with. The exercise object 402 may further include one or more exercise metadata objects 404, which indicate various information about the exercise, including but not limited to a name of a particular metadata attribute and values associated with the metadata attribute. For example, the metadata objects may indicate a name of the particular exercise, a date the exercise was created, a date the exercise was last played back, the file size of the exercise, the expected time for playback of the exercise, a particular patient identifier, or the like.

The example data model 400 may also include one or more view objects 406. The view object 406 may include information on various perspectives, representations, or visual aspects of the exercise, such as backdrops for playback of the exercise. These backdrops may be identified by particular file names in a file system, or stored within the view object 406 itself. For example, the view object 406 may include an initial backdrop for display with the exercise and a final backdrop for display with the exercise. For example, the initial backdrop may provide a backdrop against which actions are executed, and the final backdrop may provide a view of the exercise after the completion of all actions. In this manner, the exercise may include information sufficient to allow a viewer to see both the initial state and the final state, and to perform actions to attempt to recreate the final state. Although the instant example is provided with respect to two backdrops, it should also be appreciated that any number of backdrops could be employed to provide additional points during playback for review.

It should be appreciated that exercise backdrops may also be dynamically determined. For example, the view object 406 may include a link to an imaging study type. The imaging study type may be processed using a patient identifier stored in the exercise metadata object 404 to obtain an imaging study of the particular type for the particular patient from a PACS system or electronic health records (EHR) system. As another example, the view object 406 may include a particular view or viewing angle of a medical imaging study and a link to the imaging study, such that the particular view or viewing angle is selected as the backdrop without the need to include an image file in the view object 406. In the case of dynamic backdrops, two backdrops may be saved at the time the dynamic backdrop is loaded, to account for the need for both an initial backdrop and a final backdrop.

Each view object 406 may include one or more panel objects 408. The panel objects 408 may include information pertaining to a particular panel of the exercise when played back. For example, each panel object may include a one or more of action objects 410 associated with the particular panel. During playback of the exercise, each of the actions defined within the action objects 410 may be performed against the panel defined in their associated panel object 408. Attribute objects 412 may define particular attributes of the action objects 410. For example, the action object 410 may define an action type (e.g., freehand drawing, text display, image display, shape display, or the like). The attribute objects 412 may provide additional information based on the action type, such as the coordinates for entry, a set of text for display, location and size for a shape display, colors, fonts, an image for display, or the like.

Example Process for Recording an Exercise

FIG. 5 is a flow diagram of an example process 500 for recording an exercise in accordance with embodiments of the present invention. As described above, embodiments may function to allow for recording input against a backdrop and mapping the input to actions for storage as an exercise in an exercise data model. Embodiments of the process 500 may be performed by an apparatus, such as the apparatus 102 described with respect to FIG. 1.

The process 500 may begin at action 502 by receiving a selection of a backdrop for the exercise. Selection of the backdrop may include selecting a particular image, or providing criteria for image selection during playback of the exercise. In this manner, an image may be either static and predefined, or dynamic at the time of playback. If the image is dynamic, a temporary image may be displayed as a backdrop during the recorded process. This temporary image may include the dynamic image (e.g., the dynamic image may be retrieved during the recording operation) or as a placeholder image that is just a representation of the image to be displayed during exercise playback, but which does not actually display the exercise backdrop as it will be displayed during playback. A placeholder image may be displayed, for example, in the event a database for retrieving a dynamic image is unavailable at the time of recording.

At action 504, user input is received against the backdrop. As described above, the user input may include a variety of input operations, including but not limited to key strokes, cursor movements, mouse clicks, touchpad inputs, gesture inputs, audio recordings, or the like. At action 506, the user input is mapped to a set of actions. For example, if the user input includes a mouse click, cursor movement, and release of the mouse cursor, the input may be mapped to a freehand drawing action. The parameters for the freehand drawing action may be determined by creating an action comprising a set of points in real time as the user input is performed. Each point may be associated with an (x, y) coordinate, and the action may include a type, and a name-value mapping structure to hold attributes of the action. Since freehand drawings may include multiple input operations (e.g., changes in the speed and direction of the cursor) that may each be processed by the recording application concurrently with recording and display of the input, there may be visual gaps in the recorded input within a particular drawing operation. As such, mapping of freehand drawing inputs may be provided by rendering the drawing at the particular (x, y) coordinates, storing the (x, y) coordinates, and, if a previous freehand drawing input was received, obtaining a normalized vector (e.g., a vector with a magnitude of 1) with a direction pointing from the previous freehand drawing input coordinate to the current freehand drawing input coordinate. Further display of the freehand drawing input may include iterating along each coordinate along the normalized vector path from the previous coordinates to the new coordinates, rendering the input drawing, and storing the input. Subsequently, the current coordinates may be set as the previous coordinates and the operation repeated. It should be appreciated that various other techniques could be employed for mapping particular input operations to the particular actions, such as receiving keyboard inputs to select text characters for inclusion at a particular location, and storing the text as a "text input" action with a string value corresponding to the text and a set of coordinates corresponding to the particular location. Similar techniques could also be employed for receiving shape input operations, backdrop changes, or the like.

It should be appreciated that the user input may be provided indirectly to the recording process. For example, when a radiologist performs their normal interpretation workflow using a PACS system, an exercise may be automatically created based on the input provided to the PACS system, with the inputs/actions recorded automatically at various points in the interpretation workflow. Consequently, an exercise may be automatically created and available for playback/use, even though the Radiologist did not explicitly decide to create or to perform an exercise.

At action 508, the recorded actions are stored as actions, rather than as raw user input. These actions, along with the selected backdrop and any other specified exercise parameters may be used to generate the exercise at action 510, such as by encoding the actions, backdrop, exercise parameters, and the like in a data structure corresponding to an exercise data model, such as the example data model 400 described above with respect to FIG. 4.

Example Process for Exercise Playback

FIG. 6 is a flow diagram of an example process 600 for playing back an exercise in accordance with embodiments of the present invention. As described above, embodiments may function to provide playback of an exercise for viewing and interaction by a user for recording input against a backdrop and mapping the input to actions for storage as an exercise in an exercise data model. Embodiments of the process 600 may be performed by an apparatus, such as the apparatus 102 described with respect to FIGS. 1.

At action 602, a selection of an exercise is received. As described above, the exercise may be selected within a playback interface, such as provided by a standalone playback application or a web browser. For example, the exercise may be saved as a file and opened from a storage location within a file system. At action 604, a backdrop is determined for the exercise. As described above, exercise backdrops may be selected statically or dynamically. A statically selected image may be hard-coded into the exercise file or at a particular location in a file system, while a dynamically selected image may be selected according to a query or other logic included within the exercise. For example, an image may be selected from a PACS system by querying the PACS system for an image associated with a particular patient, imaging study, view angle, or the like.

At action 606, the exercise backdrop determined at action 604 is displayed. Display of the exercise backdrop may include rendering the image on a display device as known in the art. At action 608, the next (or first) action in the exercise is identified. The action may be an action that was determined according to a mapping operation applied to user input as described with respect to FIG. 5. At action 610, this action is performed against the backdrop. The manner of performing the action may be defined within the exercise according to an action type, attributes, and the like specified for the particular action. Playback options associated with the exercise may also affect how the action is performed against the backdrop. At action 612, a determination is made as to whether additional actions are available. If additional actions remain, the process 600 returns to action 608 to begin processing of the next action. Otherwise the process 600 ends. It should be appreciated that, although the instant example process 600 only relates to the use of a single backdrop and a single action being executed at a time, some embodiments may allow for simultaneous execution of multiple actions (e.g., multiple actions applied to a single "panel" as described above with respect to FIG. 4), and/or the use of multiple backdrops (e.g., changing a backdrop in response to a particular action).

It will be understood that each element of the flowcharts, and combinations of elements in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 114 of an apparatus employing an embodiment of the present invention and executed by a processor 112 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations. It will also be understood that one or more blocks of the flowchart, and combinations of blocks in the flowchart, can be implemented by special purpose hardware-based computer systems which perform the specified functions, or combinations of special purpose hardware and computer instructions.

FIG. 7 is an illustration of an example use of an exercise 700 to track patient wound care in accordance with embodiments of the present invention. The exercise 700 depicts a backdrop with an image of a patient 702 with a plurality of indicators for wound locations 704. When patients are in the hospital and in bed for extended periods of time they develop bed sores. During care of these sores, an exercise may be recorded whereby the practitioner caring for the patient provides information documenting the date, location, stage, size, depth, wound base description, undermining and tunneling, drainage, wound edges, odor, S/S of infection, or pain. This information may be provided along with input against the backdrop to indicate the location of the wounds. As such, actions stored for the exercise may pertain to the locations of the wounds against the backdrop, along with storage of text input associated with each wound location and indicating the information about each wound as enumerated above. In this manner, the exercise may allow the practitioner to document how they scanned the patient, the wound locations, and changes in the wounds over time. Recording and playback of the exercise thus allows for accurate capture and playback of the particular time sequence and order of wound scanning to be communicated. For example, there may be clinical relevance for indicating which wound location was looked at and in which order when considering follow-up care.

Figure 8A:
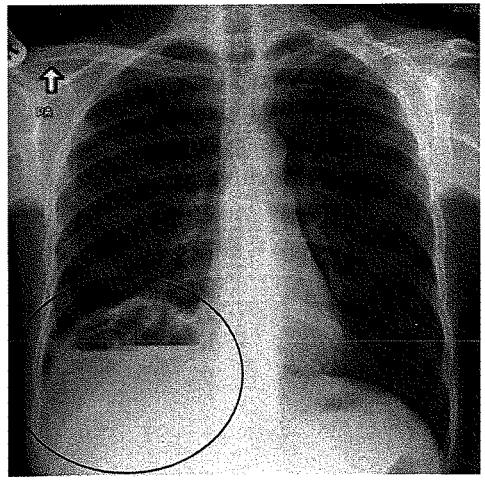
Figure 8B:
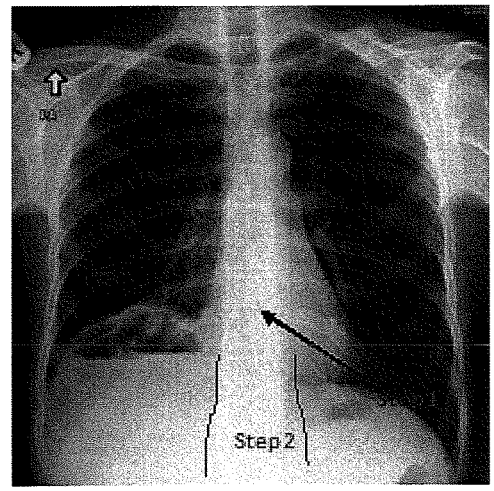
Figure 8C:
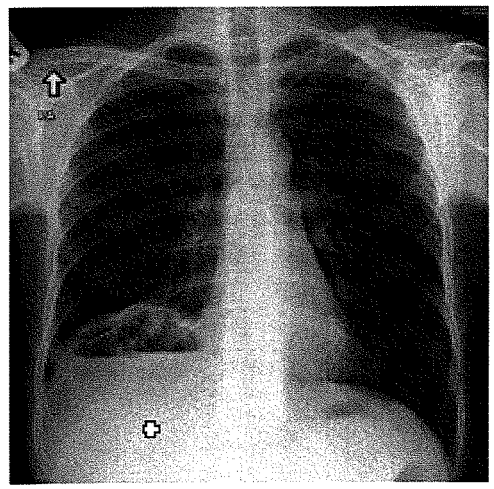
Figure 8D:
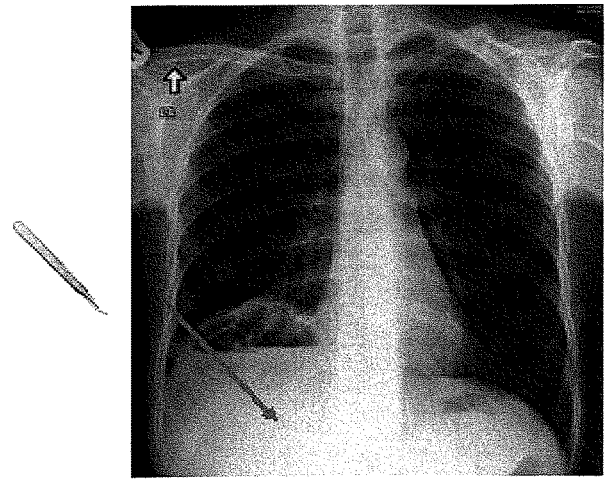

FIGS. 8A-8D illustrate an example use of an exercise to provide procedure information in accordance with embodiments of the present invention. FIGS. 8A-8D depict an example exercise that utilizes a patient's particular imaging study to illustrate a particular medical procedure to be performed on the patient. In particular, FIGS. 8A-8D illustrate a paracentesis procedure for removal of excess fluid that has accumulated in the patient's abdomen. FIG. 8A includes a backdrop of the patient's abdominal imaging study with an area circled highlighting the location of fluid buildup. FIG. 8B illustrates the same backdrop, with additional actions illustrating the location of the patient's xiphoid process and inferior epigastric arteries. FIG. 8C illustrates the same backdrop with actions applied for adding where the drain will be inserted and inject local anaesthetic. FIG. 8D illustrates the same backdrop with an action for displaying an indicator illustrating the fluid passing out of the abdomen via the inserted drain. In this manner, the example exercise serves to illustrate to the patient the elements of the particular procedure using the patient's own imaging study, without the need to record a video specifically for the patient.

It should be readily appreciated that the process described with respect to FIGS. 8A-8D could also utilize differing views of the medical images. For example, if a side scan of the image used to generate the backdrop is also available, the same actions could be shown and indicated to patients on these alternative views, which would also correspond to the four panels/figures illustrated in FIGS. 8A-8D. In some embodiments, these alternative views could be automatically generated based on a known reference angle between the view against which the actions are recorded and the alternative view, or using two dimensional images to perform the actions against a dynamically created three-dimensional representation generated from the two-dimensional images.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving criteria for selecting an exercise backdrop;
   displaying a representation of the exercise backdrop;
   receiving user input performed against an interface displaying the representation of the exercise backdrop;
   mapping the user input to at least one action; and
   generating, using a processor, an exercise data model comprising a series of objects for dynamically determining the exercise backdrop, the series of objects including an action object defining the at least one action and at least one additional object having dynamic logic that, when executed, causes selection of the exercise backdrop based on the criteria for selecting the exercise backdrop.

2. The method of claim 1, wherein the representation of the exercise backdrop is a placeholder image other than the exercise backdrop.

3. The method of claim 1, wherein the at least one action includes at least one of a freehand drawing action, a shape display action, or an icon display action.

4. The method of claim 1, wherein the user input comprises a plurality of individual input operation, and the at least one action is a single action.

5. The method of claim 1, wherein the at least one action comprises an action type and at least one action attribute.

6. The method of claim 1, further comprising playing back the exercise by at least:
   displaying the exercise backdrop in a playback interface; and
   in an instance in which the at least one action comprises a plurality of actions, applying the plurality of actions to the exercise backdrop in a sequence corresponding to an order in which the plurality of actions were input during the recording process.

7. The method of claim 6, wherein displaying the exercise backdrop in the playback interface further comprises executing the dynamic logic to select the exercise backdrop.

8. The method of claim 6, further comprising:
receiving a selection of a backdrop toggle control during playback; and
hiding the exercise backdrop in response to receiving the selection of the backdrop toggle.

9. The method of claim 6, further comprising providing an interface for annotating the exercise backdrop during playback.

10. The method of claim 1, wherein the exercise backdrop is an image corresponding to a medical imaging study for a particular patient, and wherein the at least one action illustrates at least one step of a medical procedure under consideration for the particular patient.

11. An apparatus comprising processing circuitry configured to cause the apparatus to:
receive criteria for selecting an exercise backdrop;
display a representation of the exercise backdrop;
receive user input performed against an interface displaying the representation of the exercise backdrop;
map the user input to at least one action; and
generate an exercise data model comprising a series of objects for dynamically determining the exercise backdrop, the series of objects including an action object defining the at least one action and at least one additional object having dynamic logic that, when executed, causes selection of the exercise backdrop based on the criteria for selecting the exercise backdrop.

12. The apparatus of claim 11, wherein the representation of the exercise backdrop is a placeholder image other than the exercise backdrop.

13. The apparatus of claim 11, wherein the at least one action includes at least one of a freehand drawing action, a shape display action, or an icon display action.

14. The apparatus of claim 11, wherein the user input comprises a plurality of individual input operation, and the at least one action is a single action.

15. The apparatus of claim 11, wherein the at least one action comprises an action type and at least one action attribute.

16. The apparatus of claim 11, further caused to:
display the exercise backdrop in a playback interface; and
in an instance in which the at least one action comprises a plurality of actions, apply the plurality of actions to the exercise backdrop in a sequence corresponding to an order in which the plurality of actions were input during the recording process.

17. The apparatus of claim 16, wherein displaying the exercise backdrop in the playback interface further comprises executing the dynamic logic to select the exercise backdrop.

18. The apparatus of claim 16, further caused to:
receive a selection of a backdrop toggle control during playback; and
hide the exercise backdrop in response to receiving the selection of the backdrop toggle.

19. The apparatus of claim 16, further caused to provide an interface for annotating the exercise backdrop during playback.

20. A computer program product comprising at least one computer-readable storage medium bearing computer program instructions embodied therein for use with a computer, the computer program instructions comprising program instructions configured to:
receive criteria for selecting an exercise backdrop;
display a representation of the exercise backdrop;
receive user input performed against an interface displaying the representation of the exercise backdrop;
map the user input to at least one action; and
generate an exercise data model comprising a series of objects for dynamically determining the exercise backdrop, the series of objects including an action object defining the at least one action and at least one additional object having dynamic logic that, when executed, causes selection of the exercise backdrop based on the criteria for selecting the exercise backdrop.

* * * * *